United States Patent [19]

Summerfield

[11] 4,351,450

[45] Sep. 28, 1982

[54] GROOVE STRUCTURE FOR A RETAINING RING

[75] Inventor: James D. Summerfield, Saginaw, Mich.

[73] Assignee: General Motors Corporation, Detroit, Mich.

[21] Appl. No.: 271,658

[22] Filed: Jun. 8, 1981

[51] Int. Cl.³ .............................................. B65D 45/32
[52] U.S. Cl. ..................................................... 220/319
[58] Field of Search ................................. 220/319, 320

[56] References Cited

U.S. PATENT DOCUMENTS

| | | | |
|---|---|---|---|
| 2,215,566 | 9/1940 | Schaaf, Jr. | 220/319 X |
| 2,301,879 | 11/1942 | Jenny | 220/319 |
| 2,350,651 | 6/1944 | Taubert et al. | 220/319 X |
| 2,725,252 | 11/1955 | Greer | 220/319 X |
| 2,790,462 | 4/1957 | Ashton | 220/319 X |

Primary Examiner—George T. Hall
Attorney, Agent, or Firm—Donald F. Scherer

[57] ABSTRACT

A retaining ring is disposed in an annular groove to maintain a cap member positioned in a circular opening. The retaining ring is substantially toroidal in shape having a circular cross section. The groove in which the retaining ring is seated, has a centerline which is defined by the intersection of two opposed surfaces of revolution. Each surface of revolution has a cross-sectional configuration which is defined by a radius of curvature having its center axially offset from the groove centerline toward the opposed surface of revolution. The forces exerted on the retaining ring by the cap member are transferred to the annular groove. The loading of the ring is supported by both surfaces of the annular groove.

3 Claims, 3 Drawing Figures

GROOVE STRUCTURE FOR A RETAINING RING

This invention relates to retaining structures and more particularly to the groove configuration utilized with a toroidal retaining ring.

It is an object of this invention to provide an improved retaining ring and groove structure wherein the forces imposed on the ring are supported by both side walls of the groove structure and wherein the resultant forces of the housing containing the groove are in a direction oblique to the central axis of the housing.

It is another object of this invention to provide an improved retaining ring structure wherein the groove configuration has a centerline defined by surfaces of revolution, each of which have a radius of curvature having the center thereof axially offset from the centerline of the groove so as to provide at least line contact between the locking ring and both surfaces of revolution.

These and other objects and advantages of the present invention will be more apparent from the following description and drawings in which.

Figure 1:
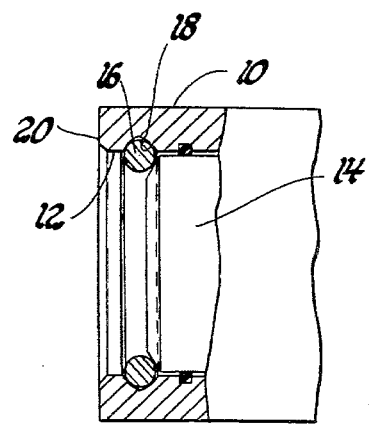
FIG. 1 is a cross-sectional elevational view of a housing and an end cap retaining structure.

Referring to the drawings, wherein like characters represent the same or corresponding parts throughout the several views, there is seen in FIG. 1a housing member 10 which includes a circular opening 12. An end cap 14 is positioned in the opening 12 and limited in its leftward movement by a retaining ring 16 disposed in a groove 18. The housing 10 can be part of a hydraulic pump assembly or a power steering gear assembly. Both of these assemblies can incorporate structures such as that shown in FIG. 1. A sample of a pump can be seen in U.S. Pat. No. 3,207,077 issued to Zeigler et al Sept. 21, 1965, and a sample of a steering gear can be seen in U.S. Pat. No. 3,022,772 issued to Zeigler et al. Feb. 27, 1962. In such structures, it is necessary for the retaining ring structure to absorb the forces imposed on the end cap 14 which forces are transmitted to the housing 10.

In conventional retaining ring structures using a circular cross section ring, the bottom of the retaining groove is generally flat and the side walls of the retaining groove generally have a radius of curvature equal to or slightly larger than the radius of curvature of the locking ring. The result is that the ring moves to one side of such a groove structure so that the forces imposed on the housing emanate from the bottom of the groove structure in a direction substantially parallel to the axis of the opening 12. Therefore, the area of the housing subject to the shear forces is that area which extends from the bottom of the groove to the end 20 of the housing 10.

Figure 2:
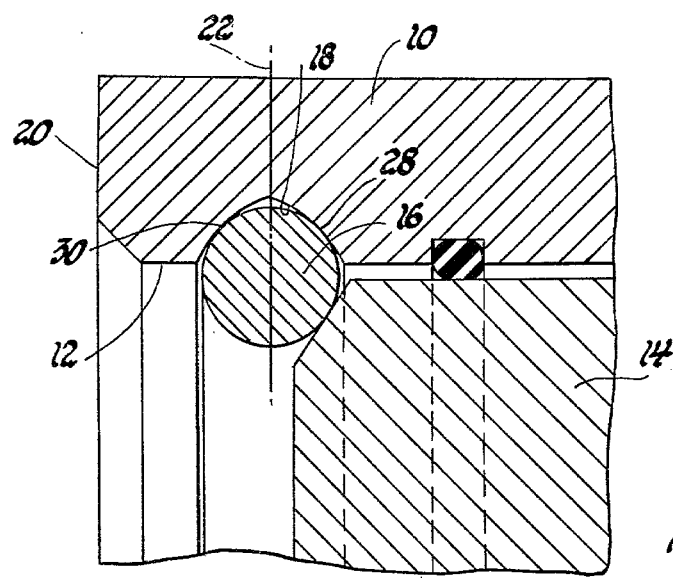
FIG. 2 is an enlarged view of a portion of the structure shown in FIG. 1.
Figure 3:
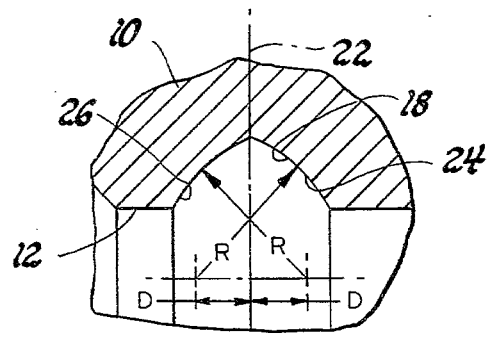
FIG. 3 is a view showing the groove portion of the retaining ring structure.

The present invention, as more clearly shown in FIGS. 2 and 3, has a groove structure which is substantially different from the known prior art structures. The groove 18 has a centerline 22 which is defined by the intersection of the side walls 24 and 26. Each side wall 24 and 26 is defined by a surface of revolutions having a cross-sectional configuration as seen in FIG. 3. This cross-sectional configuration is defined by a radius (R) having its center axially offset a distance (D) from the centerline 22 of the groove 18. This cross-sectional configuration may be defined as having an epitoroidal shape.

When the retaining ring 16 is seated in the groove 18, it is forced into contact with the side walls 24 and 26 at points 28 and 30, respectively, as seen in FIG. 2. This point contact results in line contact around the circumference of the respective groove sides so that the resultant force on the retaining ring 16 is shared by the groove side walls 24 and 26 with the major portion of the force being absorbed by the side wall farthest from the end cap 14; namely, side wall 26. The resultant force due to the loading of retaining ring 16 passes through the intersection of the side walls, that is, centerline 22, in a direction substantially parallel to the direction of the force imposed on side wall 26 and oblique to the axis of opening 12.

In conventional groove structures, the direction of the resultant force can be somewhat controlled by utilizing an angular surface on the end cap 14. This results in a combination of shear and hoop stresses on the housing. However, the groove and end cap configurations result in variable axial positioning of the end cap due to the changes in groove diameter caused by the manufacturing process tolerances. In view of these factors, the prior art devices have limited the angle on the end cap to approximately 15°. Thus, the control of force direction is somewhat limited.

In utilizing the epitoroidal shape, it has been found that the centerline of the groove remains in the same axial plate regardless of the groove diameter. This makes it possible to utilize a ball type inspection gauge and the axial positioning of the groove is more easily accomplished during machine set up.

With the use of an epitoroidal groove, the radii (R) can be judiciously selected so that the resultant force is directed through the thickest section of the housing, preferably to the corner thereof. This permits the dimension of the housing structure between the groove 18 and end 20 to be a minimum resulting in a savings of both space and weight for the overall system.

The embodiments of the invention in which an exclusive property or privilege is claimed are defined as follows:

1. A retaining structure for an end cap in a circular opening in a housing comprising; an annular groove in the housing having a centerline defined by the intersection of two opposed surfaces of revolution, each surface of revolution having a radius of curvature with its center axially offset from the centerline towards the opposed surface of revolution, and a locking ring having a circular cross section with a radius less than the radius of either surface of revolution and being disposed in said annular groove in contact with both surfaces of revolution such that loads imposed on said locking ring by the end cap are supported by both surfaces of said annular groove.

2. A retaining structure for an end cap in a circular opening in a housing comprising; an annular groove in the housing having a centerline, an outer locating surface having a continuous radius of curvature, an inner locating surface having a continuous radius of curvature and intersecting said outer locating surface at said centerline, the center of said radius of curvature of said outer locating surface being disposed on the inner locating surface side of said centerline and the center of said radius of curvature of said inner locating surface being disposed on the outer locating surface side of said centerline; and a substantially toroidal locking ring having a circular cross section of a radius less than the locating surface radii of curvatures and being disposed in said annular groove in line contact with each of said inner and outer locating surfaces, said locking ring being abutted by the end cap and being operable to retain the end cap in the housing.

3. A retaining structure for an end cap in a circular opening in a housing comprising; an annular groove in the housing having a centerline defined by the intersection of two opposed surfaces of revolution, each surface of revolution having a radius of curvature with its center axially offset from the centerline towards the opposed surface of revolution, and a substantially toroidal locking ring having a circular cross section with a radius less than the radius of either surface of revolution and being disposed in said annular groove in contact with both surfaces of revolution such that loads imposed on said locking ring by the end cap are supported by both surfaces of said annular groove and the resultant force on said housing passes through the centerline of said annular groove at an angle oblique to the axis of the circular opening and substantially parallel to the line of action of the force on the groove surface of revolution farthest from the end cap.

* * * * *